US007453371B2

(12) United States Patent
Niyama et al.

(10) Patent No.: US 7,453,371 B2
(45) Date of Patent: Nov. 18, 2008

(54) REMOTE CONTROL DEVICE

(75) Inventors: Kaho Niyama, Inagi (JP); Itaru Hatanaka, Inagi (JP)

(73) Assignee: Fujitsu Limited, Kawasaki (JP)

( * ) Notice: Subject to any disclaimer, the term of this patent is extended or adjusted under 35 U.S.C. 154(b) by 367 days.

(21) Appl. No.: 10/379,990

(22) Filed: Mar. 6, 2003

(65) Prior Publication Data
US 2003/0204272 A1 Oct. 30, 2003

Related U.S. Application Data

(63) Continuation of application No. PCT/JP00/06098, filed on Sep. 8, 2000.

(30) Foreign Application Priority Data

Sep. 8, 2000 (JP) ................ PCT/JP00/06098

(51) Int. Cl.
G08C 19/00 (2006.01)
G05B 19/02 (2006.01)
G05B 23/00 (2006.01)
G06F 7/00 (2006.01)

(52) U.S. Cl. .............. 340/825.72; 340/5.2; 340/5.62; 340/7.55

(58) Field of Classification Search ........... 340/825.72, 340/825.22, 825.24, 825.27, 5.2, 5.62, 7.55, 340/7.56; 341/176; 348/173, 176; 345/158, 345/734; 705/5, 15, 26
See application file for complete search history.

(56) References Cited

U.S. PATENT DOCUMENTS 5,204,768 A * 4/1993 Tsakiris et al. .............. 398/107
5,648,813 A    7/1997 Tanigawa et al.
5,710,605 A * 1/1998 Nelson ........................ 348/734
5,721,583 A * 2/1998 Harada et al. ................. 725/24

(Continued)

FOREIGN PATENT DOCUMENTS

EP        0 775 995 A1    5/1997

(Continued)

OTHER PUBLICATIONS

International Search Report for corresponding PCT application PCT/JP00/06098 dated Sep. 8, 2000.

Primary Examiner—Brian Zimmerman
Assistant Examiner—Nam V Nguyen
(74) Attorney, Agent, or Firm—Staas & Halsey LLP

(57) ABSTRACT

A menu is displayed on an input function installed display device such as a liquid crystal touch panel based on display information, which is generated from menu data obtained from a station, in other words from an operation target device. When a menu to be displayed is generated, such an idea is used that a displayed menu provides information most suitable for an owner by selecting and processing proper data matching personal information registered in advance in a remote controller out of the received menu data. Age, sex, settlement information or the like can be registered as personal information, some TV channels are restricted for an owner of minority, correct owner fees for transportation facilities, theaters and movie houses are displayed where age-dependent fees are adopted, and menus for restaurants are properly displayed where charges are different for different sexes. In addition, settlement can be made concurrently with ordering when settlement information such as in credit cards are stored.

9 Claims, 9 Drawing Sheets

U.S. PATENT DOCUMENTS

| | | | |
|---|---|---|---|
| 5,734,444 A * | 3/1998 | Yoshinobu | 725/14 |
| 5,912,743 A * | 6/1999 | Kinebuchi et al. | 358/442 |
| 6,040,829 A * | 3/2000 | Croy et al. | 715/864 |
| 6,133,847 A * | 10/2000 | Yang | 340/825.22 |
| 6,166,778 A * | 12/2000 | Yamamoto et al. | 348/569 |
| 6,231,347 B1 * | 5/2001 | Tsai | 434/307 A |
| 6,342,926 B1 * | 1/2002 | Hanafee et al. | 348/563 |
| 6,346,934 B1 * | 2/2002 | Wugofski | 345/158 |
| 6,401,029 B1 * | 6/2002 | Kubota et al. | 701/201 |
| 6,473,739 B1 * | 10/2002 | Showghi et al. | 705/26 |
| 6,484,011 B1 * | 11/2002 | Thompson et al. | 455/3.06 |
| 6,748,278 B1 * | 6/2004 | Maymudes | 700/17 |

FOREIGN PATENT DOCUMENTS

| | | |
|---|---|---|
| JP | 62-066799 | 3/1987 |
| JP | 09-018971 | 1/1997 |
| JP | 2000-059522 | 2/2000 |
| JP | 2000-172746 | 6/2000 |

* cited by examiner

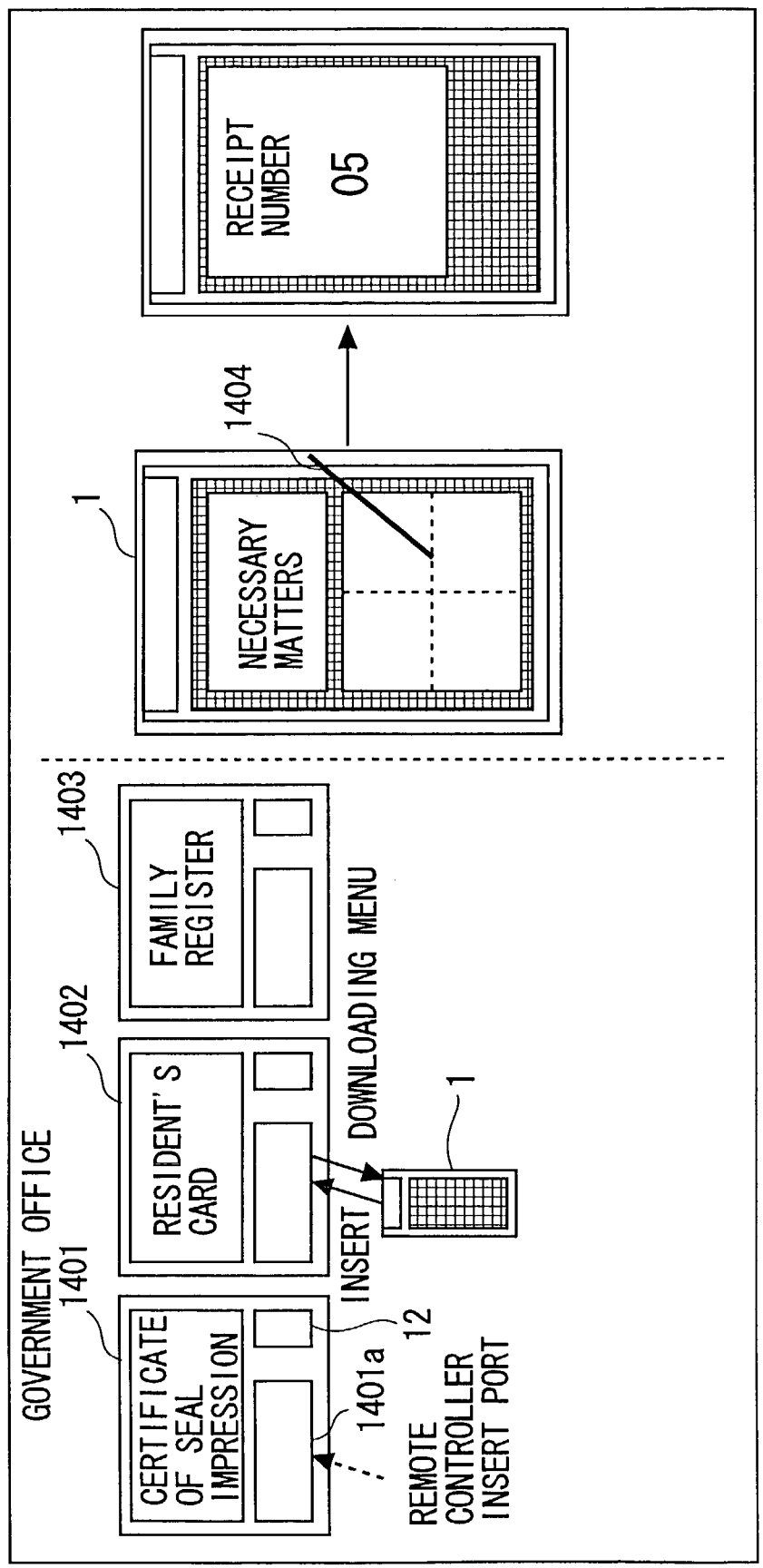

REMOTE CONTROL DEVICE

This application is a continuing application, filed under 35 U.S.C. §111(a), of International Application PCT/JP00/06098, filed Sep. 8, 2000.

TECHNICAL FIELD

The present invention relates generally to a remote controller, and more particularly to a remote controller capable of changing an input interface and display information depending on an operation target device.

BACKGROUND ARTS

With diversification of electronic devices, multiple types of remote controllers (remote control terminals) are required for domestic use.

These types of remote controllers have a tendency of increasingly getting sophisticated year after year. For example, in the case of a remote controller for air-conditioners, this remote controller is capable of displaying a room temperature in the case of a remote controller for video devices, this remote controller is capable of displaying the time. Thus, in the majority of cases, functions peculiar to operation target devices are installed into the remote controllers.

There exist, as described above, a variety of remote controllers, which lead to a problem that the management of the remote controllers becomes troublesome.

Therefore, as disclosed in Japanese Patent Application Laying-Open Publication No.8-149576 and so on, there is a proposed compatible remote controller, constructed to store device information about every operation target device as a code memory, and to change a button function depending on every operation target device.

Further, a technology (Japanese Patent Application Laying-Open No.10-271573) of changing display of a setting button in accordance with a signal from the operation target device, is also known.

In the remote controllers of the prior arts given above, however, if the operation target device is, e.g., a video device, stereotyped functions such as [recording], [playback], [fast forwarding], [rewinding] and so on are just laid out or displayed as buttons.

Namely, the functions of the remote controller dedicated to the operation target device are no more than being actualized in respective scenes, and the functions necessary for the operation target device are merely actualized in the stereotyped fashion.

It is a technical object of the present invention, which was devised in view of the above points, to actualize a display interface on a remote controller, which provides optimal functions in consideration of an operator.

DISCLOSURE OF THE INVENTION

The present invention is that menu data is obtained from a station, i.e., an operation target device, display information is generated from the menu data, and a menu is displayed based on the display information on an input function installed display device such as a liquid crystal touch panel etc.

Further, a contrivance thereof is that when being generated the menu to be displayed, a menu displayed is structured into information corresponding to an owner thereof, by selecting or processing menu data, which is received mapping to individual information registered beforehand within the remote controller.

Pieces of information about an age, a distinction of sex, settlement and so forth may be registered as the individual information. If the owner is a minor, some of TV channels are restricted, there can be displayed an owner's fee for transport facilities, a theater, a movie etc that set fees different depending on the ages, or a menu at a restaurant that provides a different fee system depending on a distinction of sex, can be properly displayed. Moreover, the settlement information of a credit card etc is previously stored, whereby the settlement can be made simultaneously with giving an order.

BRIEF DESCRIPTION OF THE DRAWINGS

FIG. 14 is a conceptual diagram in a case making an application for a document at a government office by use of the remote controller in the embodiment.

BEST MODE FOR CARRYING OUT THE INVENTION

Figure 1:
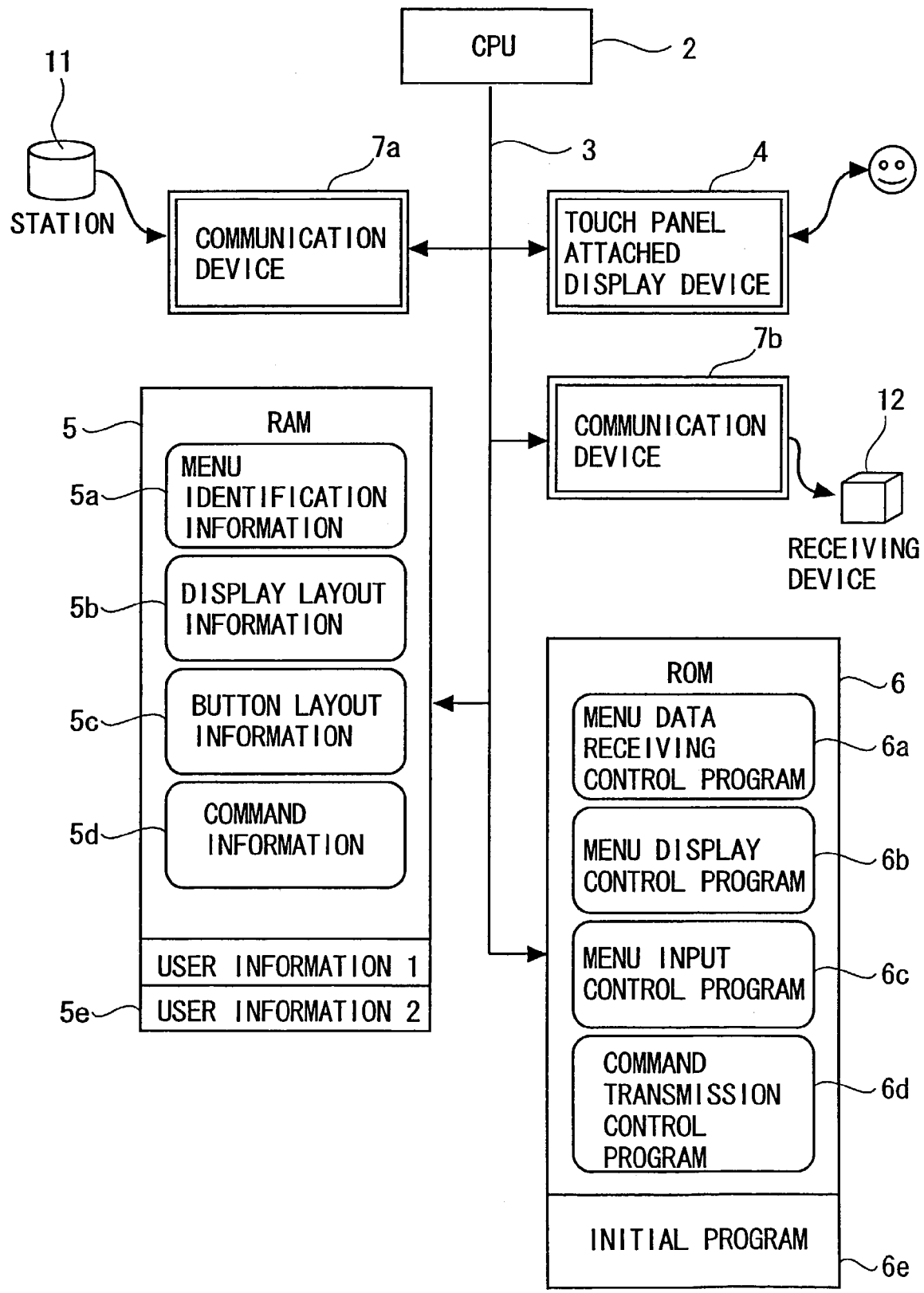
FIG. 1 is a block diagram showing an internal structure of a remote controller by way of an embodiment of the present invention.

FIG. 1 is a block diagram showing an internal structure of a remote controller by way of one embodiment of the present invention.

Figure 3:
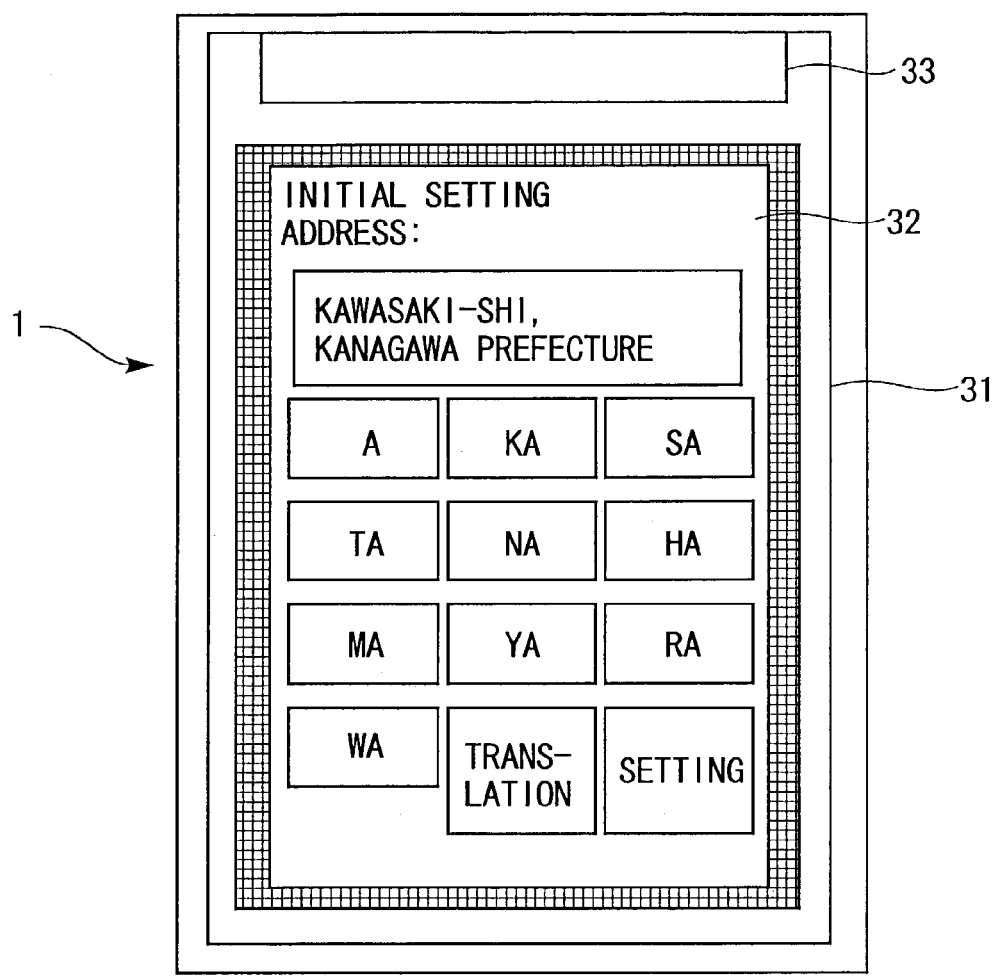
FIG. 3 is an explanatory diagram showing an initial setting screen on the remote controller in the embodiment.

A remote controller body 1 in this embodiment has a frame structure 31 portable when going out in addition to its domestic use. A liquid crystal touch panel 32 such as an LCD etc is provided on the surface of the frame, as shown in FIG. 3, and this portion is constructed as a display device 4. Further, an infrared-rays transmitting/receiving unit 33 is provided at an upper front end thereof.

A touch panel attached display device 4, a RAM 5, a ROM 6 and communication devices 7a, 7b, are provided around a bus 3 to which a central processing unit (CPU) 2 is connected, inside of the remote controller body 1.

Menu identification information 5a, display layout information 5b, button layout information 5c and command information 5d, are registered within the RAM 5.

The menu identification information 5a accumulates pieces of information for identifying menus depending on an operation target device. The display layout information is information for determine a layout of the information displayed on the display device 4. The button layout information 5c is layout information of remote control buttons actualized as a touch panel. The command information 5d is information that defines a command of every button.

Further, user information 5e is stored in the RAM 5. The user information will be described later.

A menu data receiving control program 6a, a menu display control program 6b, a menu input control program 6c, a command transmission control program 6d and an initial program 6e are stored in the ROM 6.

The menu data receiving control program 6a is a program for receiving the menu information from an external station 11 via the communication device 7a. The menu display control program 6b is a program for displaying the menu displayed on the display device 4. The menu input control program 6c is a program for controlling the command inputted through the button displayed on the display device 4. The command transmission control program 6d is a program for transmitting the command to an external receiving device 12 via the communication device 7b when the button laid out on the display device 4 is manipulated.

Figure 2:
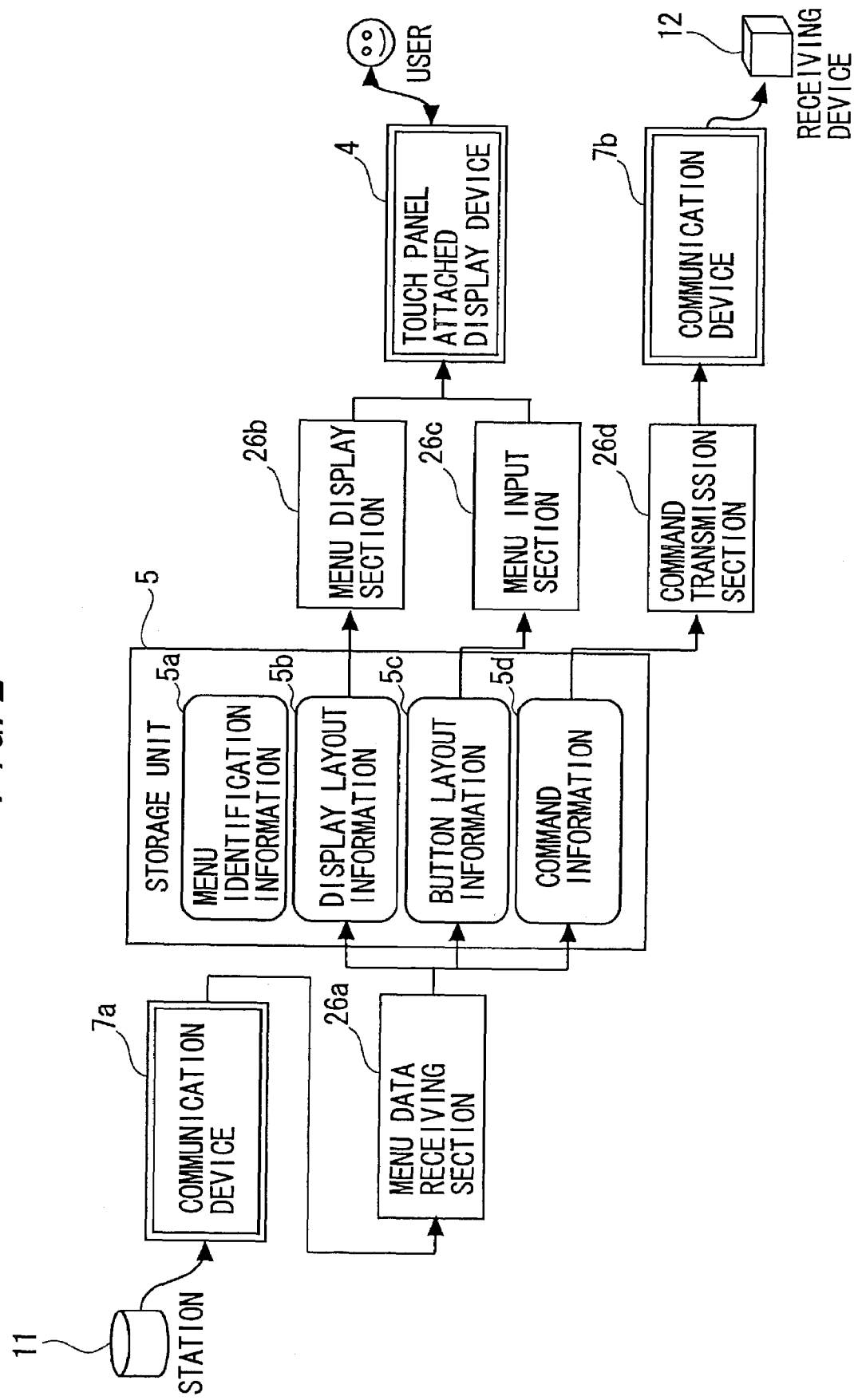
FIG. 2 is a function block diagram showing a data flow within the remote controller in the embodiment.

FIG. 2 shows a data flow within the remote controller body 1.

To start with, a menu data receiving section 26a receives the menu data from the station 11 via the communication device 7a. This menu data receiving section 26a is actualized by the menu data receiving control program 6a.

When the menu data received by the menu data receiving section 26a, is identified based on the menu identifying information 5a in the RAM 5, the menu data is stored as pieces of display layout information 5b, button layout information 5c and command information 5d.

Then, the display layout information 5b is sent to a menu display section 26b, the button layout information 5c is sent to a menu input section 26c, and the command information 5d is sent to a command transmission section 26d, respectively.

Herein, the menu display section 26b is actualized by the menu display control program 6b. The menu input section 26c is actualized by the menu input control program 6c. The command transmission section 26d is actualized by the command transmission control program 6d.

A menu screen generated by the menu display section 26b is displayed on the display device 4. Further, the menu input section 26c notifies the command transmission section 26d of input information inputted on the menu screen displayed on this display device 4, and the command transmission section 26d transmits the command selected from the menu to the receiving device 12 via the communication device 7b.

FIG. 3 shows a display screen on the liquid crystal touch panel 32 in the initial setting of the remote controller body 1.

When the initial program 6e is activated, an initial screen as shown in FIG. 3 is displayed, and a name, an address, an age and a distinction of sex of an operator are inputted. This individual information is stored as the individual information 5e in the RAM 5.

Figure 6:
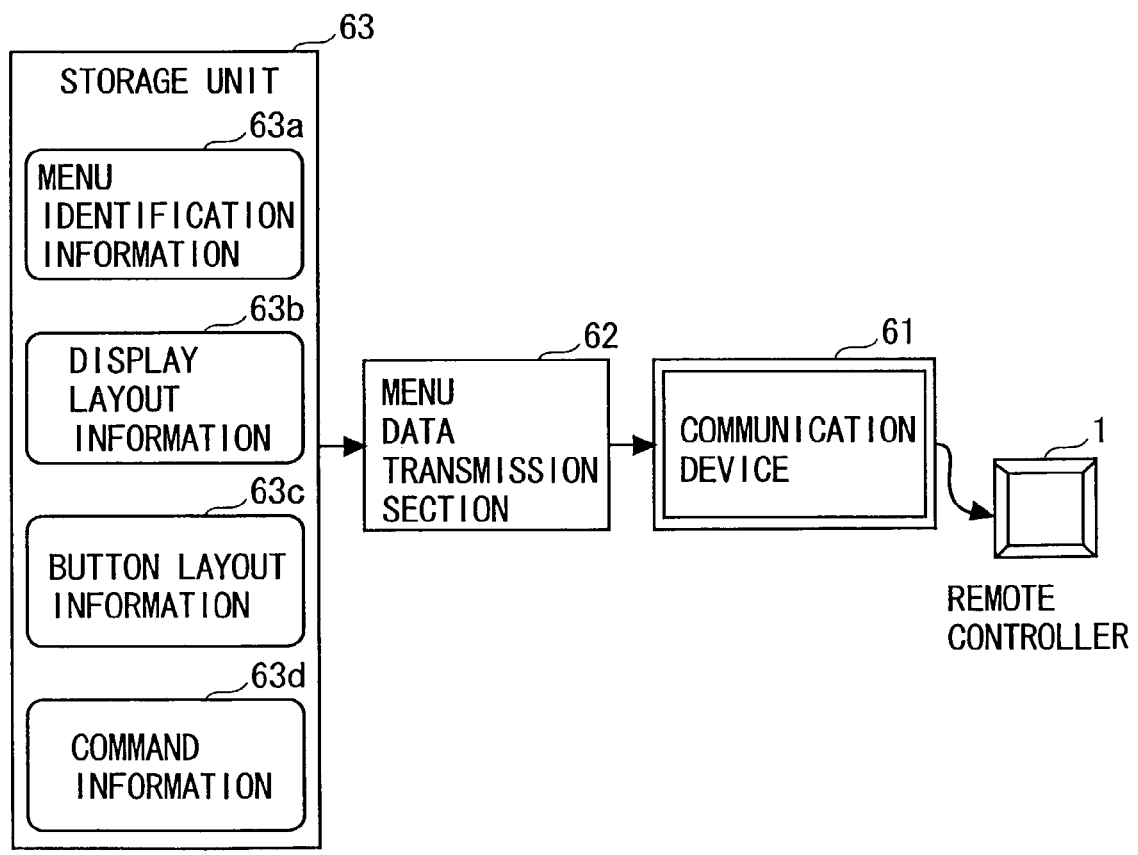
FIG. 6 is a function block diagram showing a data flow within a station in the embodiment.

FIG. 6 is a block diagram showing an internal structure of the station 11, corresponding to the remote controller body 1.

A ROM 63, a menu data transmission section 62 and a communication device 61 are provided at the station 11. Menu identification information 63a, display layout information 63b, button layout information 63c and command information 63d are registered in the ROM 63. These pieces of information are read by the menu data transmission section 62, and transmitted to the remote controller body 1 via the communication device 61.

Figure 7:
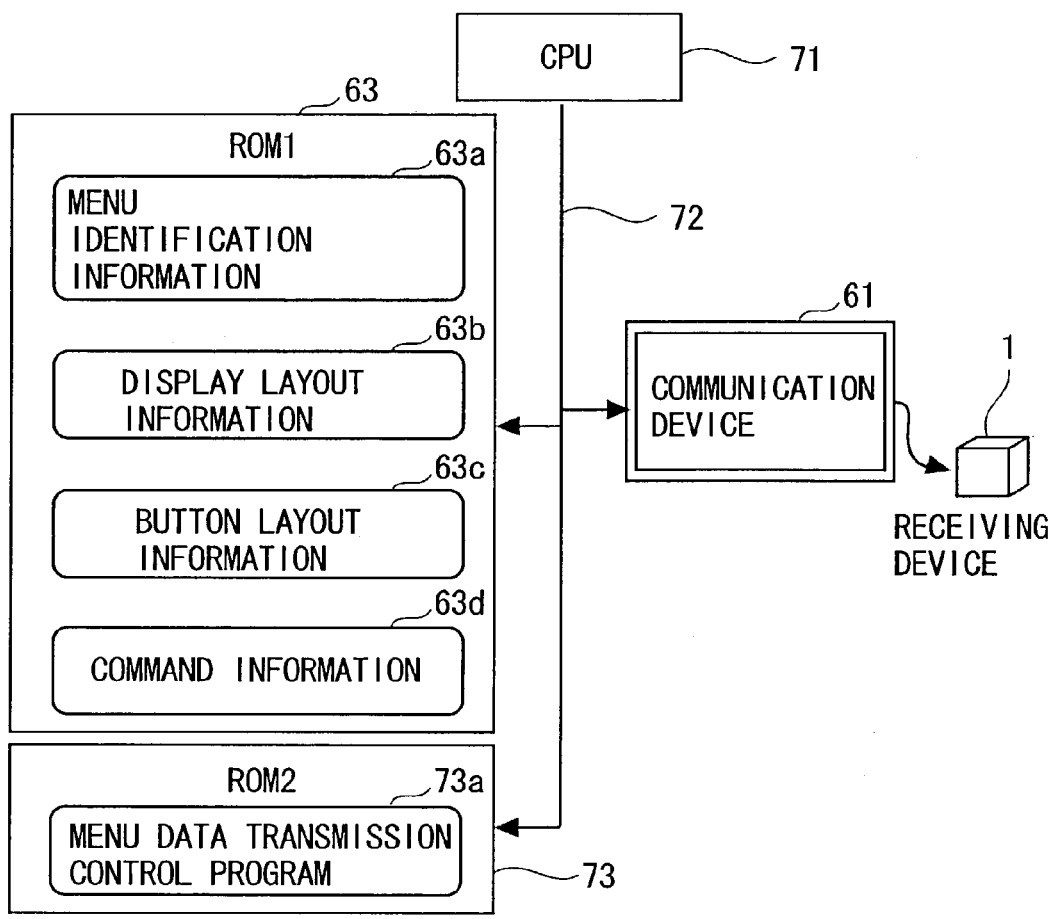
FIG. 7 is a block diagram showing an internal structure of the station in the embodiment.

FIG. 7 is a block diagram showing the internal structure of this station 11.

The station 11 includes a first ROM 63 and a second ROM 73, around a central processing unit (CPU) 71 and a bus 72. The menu identification information 63a, the display layout information 63b, the button layout information 63c and the command information 63d are stored in the first ROM 63.

On the other hand, menu data transmission program 73a is stored in the second ROM 73. Each item of information in the first ROM 63 is, when read by this menu data transmission program 73a, transmitted to the remote controller body 1 via the communication device 61.

Figure 4:
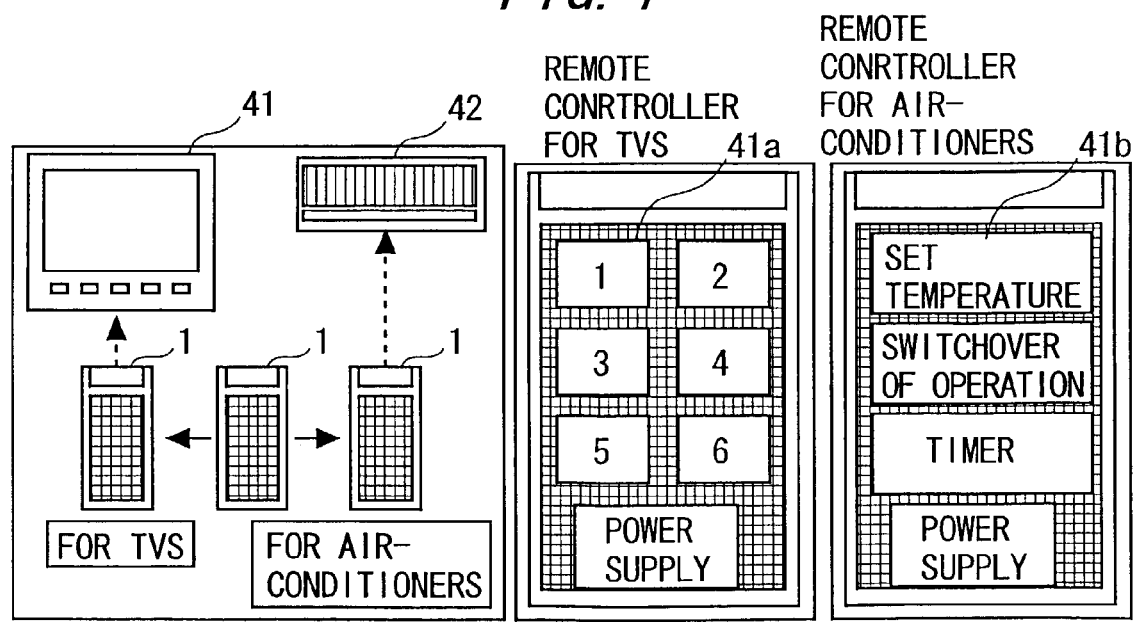
FIG. 4 is a diagram showing a difference between interface screens in a case of using the remote controller in the embodiment as a remote controller for TV receivers and in a case of using it as a remote controller for air-conditioners.

FIG. 4 shows display modes on the liquid crystal touch panel 32 in a case where the present remote controller body 1 is utilized as a TV remote controller and an air-conditioner remote controller.

The system of the station 11 explained in FIG. 6 is installed in a TV receiver 41 and in an air-conditioner body 42.

When the remote controller body 1 is directed to the TV receiver 41, each item of information stored in the ROM 63 is transmitted by a communication device 61 of the system of the station 11 in the TV receiver 41, and this information is processed by the menu display section 26b shown in FIG. 2, with the result that a display screen for TVs 41a is displayed on the liquid crystal touch panel 32 of the remote controller body 1.

Numeral buttons for selecting channels and a power supply button are displayed on the display screen for TVs 41a. With the operator's pressing this button area with a tip of the finger, the operation is detected through the liquid crystal touch panel 32, and a command is transmitted to the TV receiver 41 via the communication device 7b from the command transmission section 26d.

When the remote controller body 1 is directed to the air-conditioner body 42, each item of information stored in the ROM 63 is transmitted from a communication device 61 of the system of the station the air-conditioner body 42, and this information is processed by the menu display section 26b shown in FIG. 2, with the result that display screen for air-conditioners 41b is displayed on the liquid crystal touch panel 32 of the remote controller body 1.

A temperature setting button, an operation switchover button and a timer button are displayed on the display screen for air-conditioners 41b. With the operator's pressing this button area with the tip of the finger, the operation is detected through the liquid crystal touch panel 32, and a command is transmitted to the air-conditioner body 42 via the communication device 7b from the command transmission section 26d.

Figure 5:
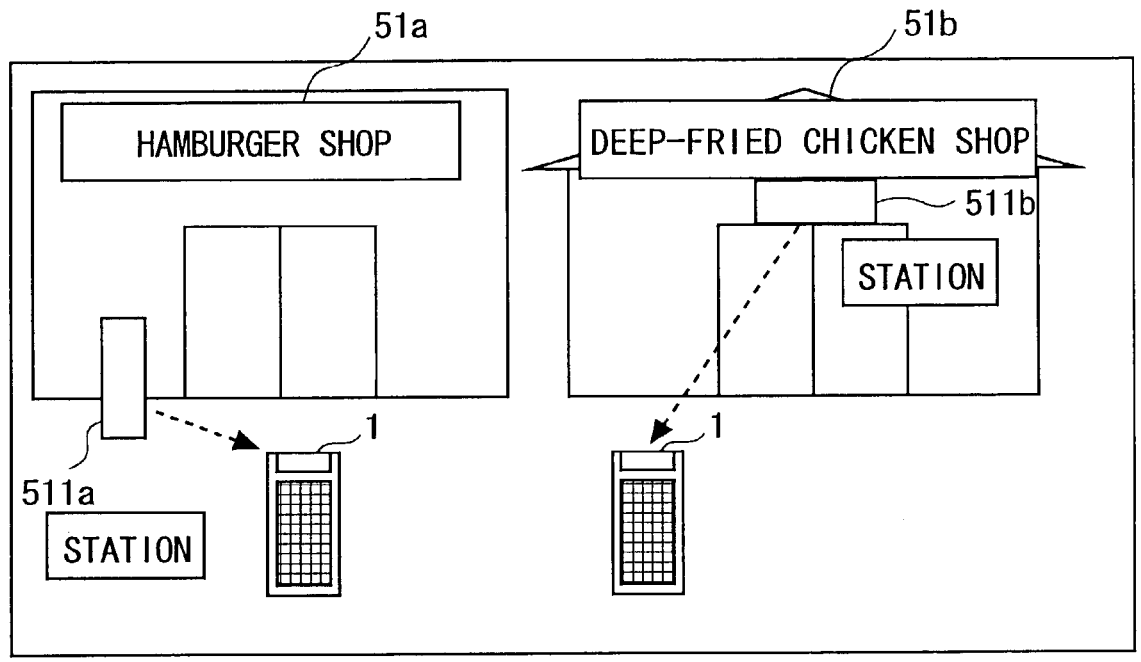
FIG. 5 is a conceptual diagram in a case of using the remote controller in the embodiment at the counter of a restaurant.

FIG. 5 shows a case in which the remote controller body 1 is used at the counter of a hamburger shop 51a and at the counter of a deep-fried chicken shop 51b.

A station for hamburger shops 511a is installed at the counter of a hamburger shop 51a, and a station for deep-fried chicken shops 511b is installed at the counter of a deep-fried chicken shop 51b.

Each of the station for hamburger shops 511a and the station for deep-fried chicken shops 511b has the structure explained in FIG. 6.

Namely, a menu for hamburger shops e.g., names of foods such as [hamburger], [cheese-burger] etc and pieces of price information, are stored in the ROM 63 of the station for hamburger shops 511a, and these pieces of information are read out and transmitted by the menu data transmission section 62 to the remote controller body 1 via the communication device 61. Food menu buttons of [hamburger], [cheese-burger] etc and prices are displayed corresponding thereto on the remote controller body 1.

On the other hand, a menu for deep-fried chicken shops, e.g., names of foods such as [deep-fried chicken], [deep-fried potato] etc and pieces of price information, are stored in the ROM 63 of the station for deep-fried chicken shops 511b, and these pieces of information are read out and transmitted by the menu data transmission section 62 to the remote controller body 1 via the communication device 61. Food menu buttons of [deep-fried chicken], [deep-fried potato] etc and prices are displayed corresponding thereto on the remote controller body 1.

Figure 8:
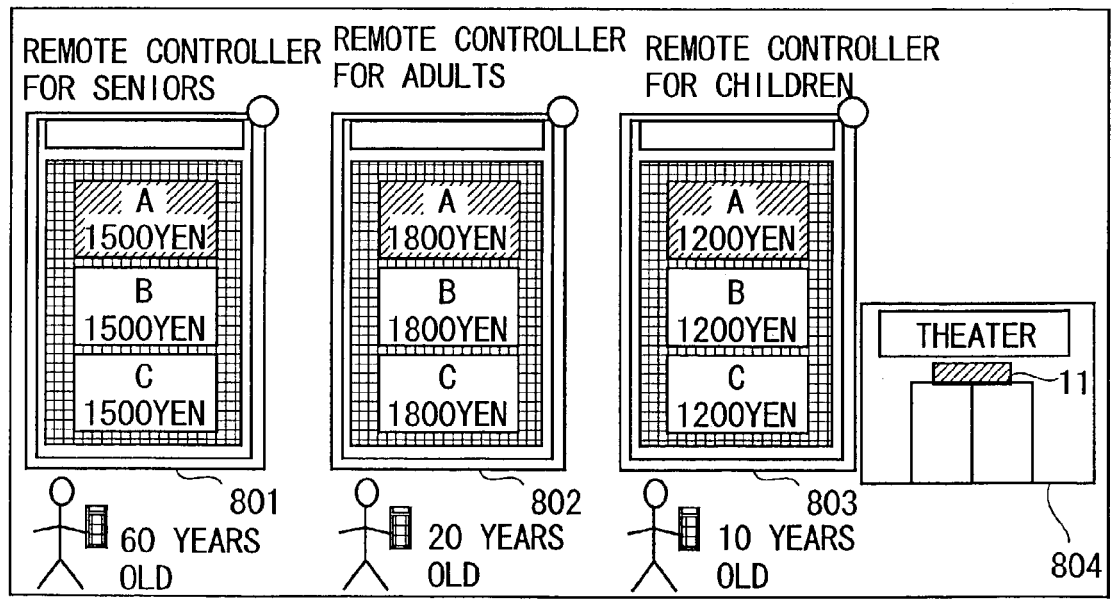
FIG. 8 is a diagram showing a difference of the interface screens in a case of using the remote controller in the embodiment at a theater.

FIG. 8 shows differences of pieces of information displayed on the liquid crystal touch panel 32 of the remote controller according to the operator (owner).

When receiving the menu data from the station 11 of a theater 804, the menu display control program 6b reads out the piece of user information 5e stored in the RAM 5 and displays only the menu data corresponding to this piece of user information 5e on the liquid crystal touch panel 32.

Namely, in this theater 804, a child fee, an adult fee and a senior fee are priced for every seat. When these pieces of fee information are received as menu data by respective remote controllers 801, 802, 803, the user information 5e within each remote controller is read out, and the menu information of a fee category corresponding to an age of the operator within the user information, is displayed as a button. To be specific, if the operator (owner) of the remote controller 801 is 60 years old, a button of a fee system for 60 years old is displayed. If the operator (owner) of the remote controller 802 is 20 years old, a button of a fee system for 20 years old is displayed. If the operator (owner) of the remote controller 803 is 10 years old, a button of a fee system for 10 years old is displayed.

When one of these buttons is pressed by the operator (owner) presses, a seat reservation corresponding to the button, which is operated for the station 11 at the theater 804 is given.

Figure 9:
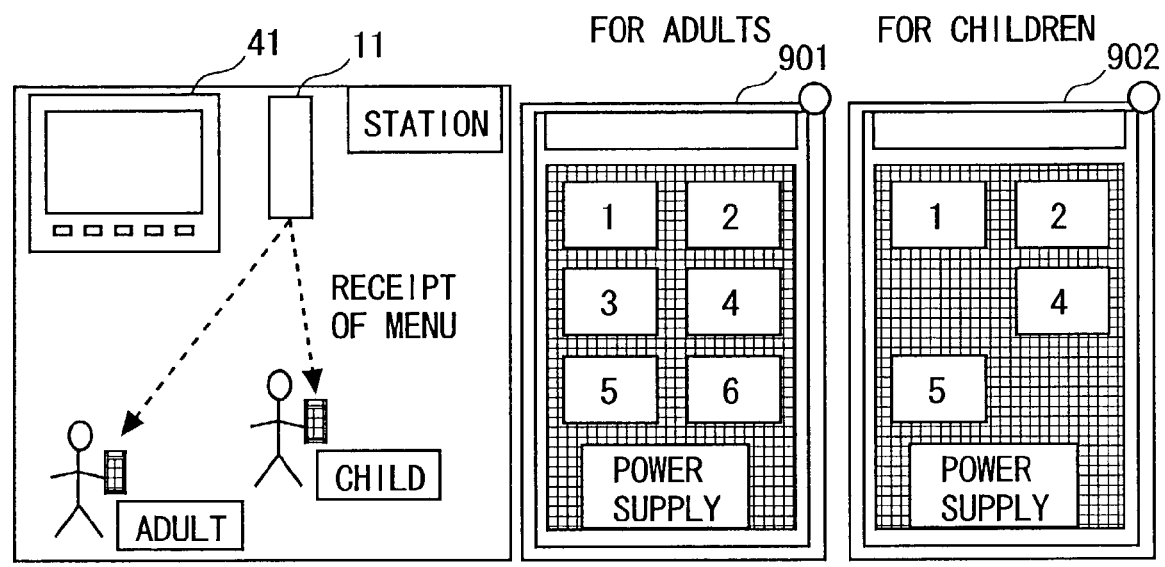
FIG. 9 is an explanatory diagram showing a difference of the interface screens in a case of using the remote controller in the embodiment as a remote controller for TV receivers with the viewer's age limit.

FIG. 9 shows a difference between pieces of information displayed on the liquid crystal touch panel 32 in a case where the adult and the child operates their own remote controllers 901, 902 toward the TV receiver 41.

When receiving the menu data from the station of the TV receiver 41, the menu display control program 6b reads out the user information 5e stored in the RAM 5, and displays only the menu data corresponding to this piece of user information 5e on the liquid crystal touch panel 32 of each remote controller 901, 902.

Herein, undesirable channels (display inhibited channels that are herein Channel 3 and Channel 6) for the children can be registered on the remote controller for children 902 by parents, and this piece of information is registered in the user information 5e in the RAM 5.

Accordingly, on the remote controller for children 902 having received the menu data from the station 11, the menu display control program 6b reads out the display inhibited channels stored in the user information 5e and performs a scheme that the buttons of the channels coming under these channels are not displayed on the liquid crystal touch panel 32.

Figure 10:
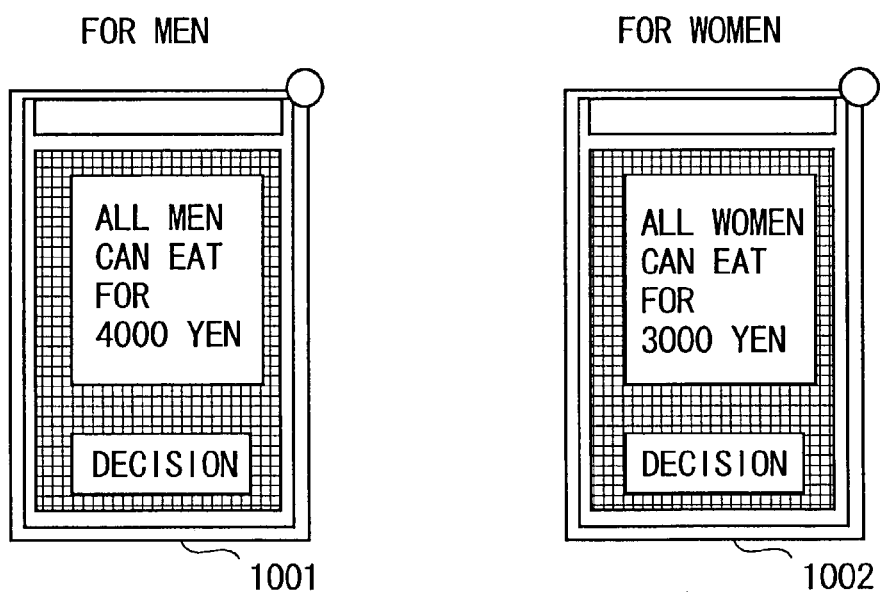
FIG. 10 is an explanatory diagram showing a difference of the interface screens in a case of using the remote controller in the embodiment at a restaurant that provides different fee system depending on a distinction of sex.

FIG. 10 shows a difference between pieces of information on the liquid crystal touch panels 32 in a case where a fee setting is changed depending on a male and a female at a restaurant etc.

Distinctions of sexes (male, female) of the operators (owners) are respectively registered in the user information 5e in the RAMs 5 of remote controllers 1001, 1002.

At the counter of an unillustrated restaurant, when the remote controllers 1001, 1002 are directed to the station 11 of the restaurant, the menu is received by the remote controllers 1001, 1002 from the station 11.

In the respective remote controllers 1001, 1002, the menu data received by the menu data receiving section 26a is stored as the menu identification information 5a, the display layout information 5b, the button layout information 5c and the command information 5d stored in the RAM 5.

Next, the menu display section 26b (the menu display control program 6b) reads out the information of the distinction of sex from the user information 5e in the RAM 5, and displays the menu button corresponding to this distinction of sex on the liquid crystal touch panel 32.

At this time, [male] as the distinction of sex is registered in the user information 5e at the remote controller 1001, and [female] as the distinction of sex is registered in the user information 5e at the remote controller 1002, respectively. Hence, different pieces of information such as a male menu button [all men can eat for 4000 yen] and a female menu button [all women can eat for 3000 yen], are displayed respectively on the remote controllers 1001, 1002.

Note that the operator of each of the remote controllers 1001, 1002 manipulates a [decision button], and a decision command thereof is received by the receiving device 12 of the restaurant station 11 via the communication device 7b, with the result that a reservation or an order is done.

Figure 11:
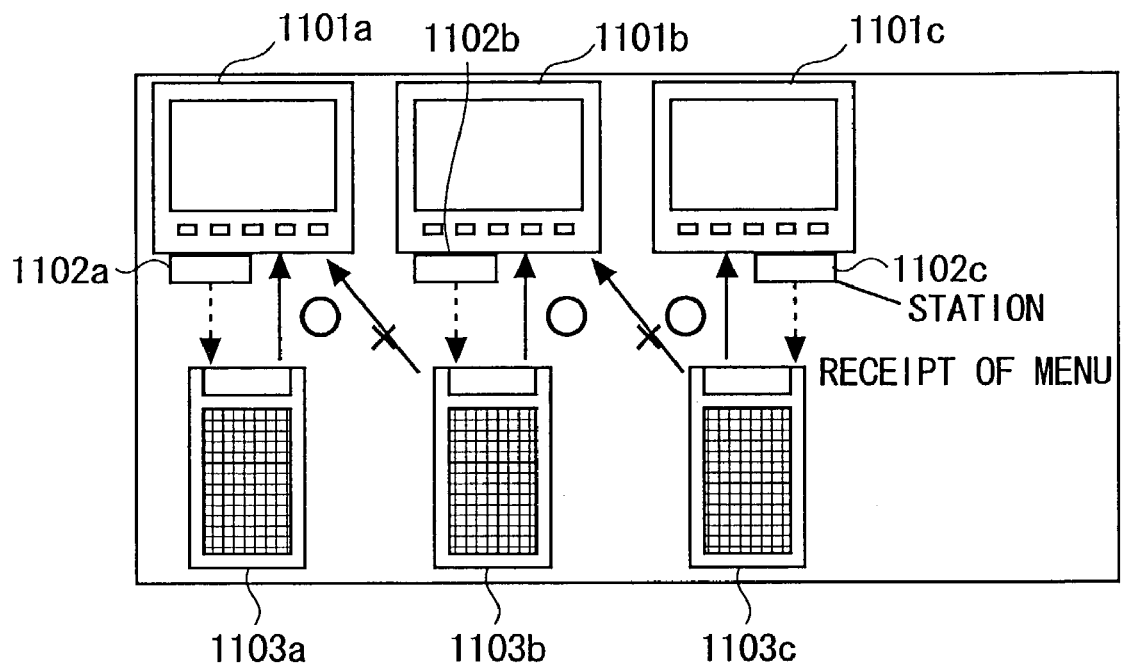
FIG. 11 is an explanatory diagram showing a concept of an initial setting for putting the remote controller in the embodiment into a function for every TV receiver.

FIG. 11 shows relationships of correspondence between a plurality of TV receivers 1101a, 1101b, 1101c and remote controllers 1103a, 1103b, 1103c.

Stations 1102a, 1102b, 1102c are installed in the respective TV receivers 1101a, 1101b, 1101c.

In this example, the communication devices 7a, 7b on the remote controller side and the communication devices on the station side, have a property of accepting only the infrared-rays communication at a near distance within approximately 2 cm therebetween.

For example, in the initial setting, a remote controller 1103a is moved close to a station 1102a of the TV receiver 101a, and receive the initial setting information from this station. In this initial setting information, ID information of the TV receiver 101a is stored.

This initial setting information is transferred to the RAM 5 from the communication device 7a. The menu data receiving control program 6a writes the initial setting information to the user information 5e in the RAM 5.

This initial setting information enables, thereafter, the remote controller 1103 to select only the menu data of the station 1102a from pieces of menu data received from the respective stations 1102a, 1102b, 1102c and to display the selected menu data on the liquid crystal touch panel 32.

Similarly, the ID information of the TV receiver 1101b is registered in the remote controller 1103b, and the ID information of the TV receiver 1101c is registered in the remote controller 1103c.

The initial setting information in the respective remote controllers as described above enables the remote controller 1103a to operate only the TV receiver 1101a, the remote controller 1103b to operate only the TV receiver 1101b, and the remote controller 1103c to operate only the TV receiver 1101c.

Figure 12:
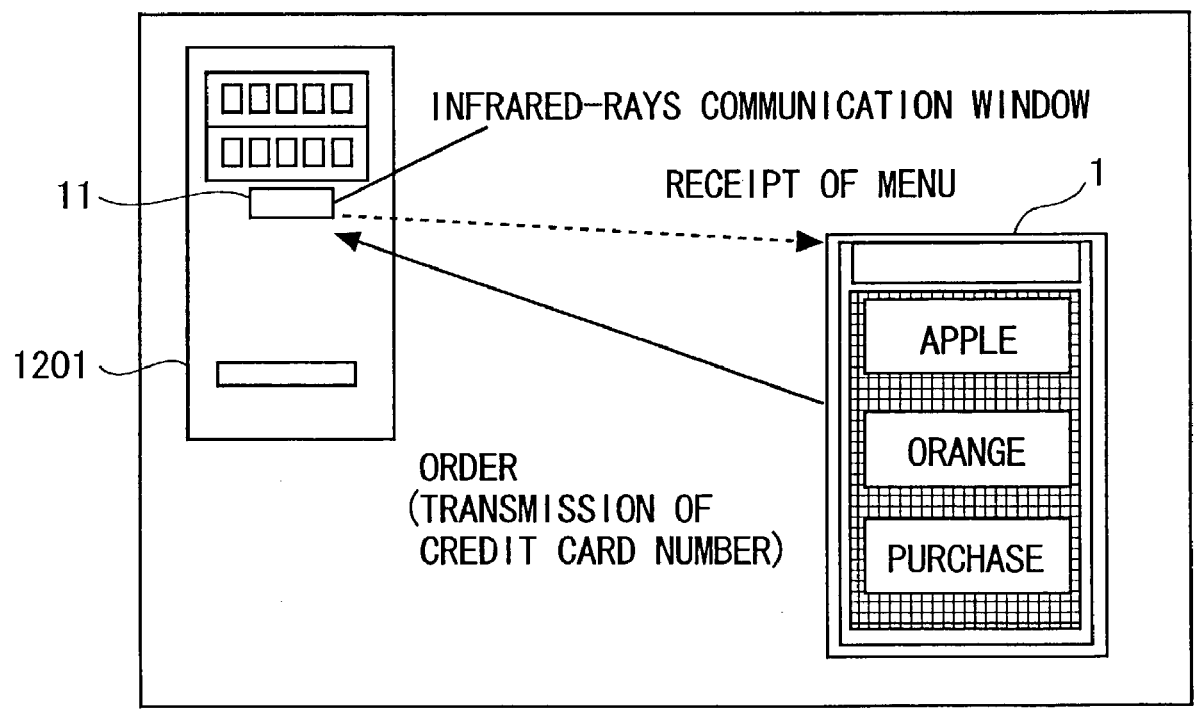
FIG. 12 is a conceptual diagram in a case of purchasing a commercial article from a vending machine by use of the remote controller in the embodiment.

FIG. 12 shows a display example on the liquid crystal touch panel 32 in the case of purchasing a commercial article from a vending machine 1201 by use of the remote controller body 1.

The user information 5e in the RAM 5 of the remote controller body 1 is registered with a credit card number of the operator (owner) as initial information.

When receiving the menu data from the station 11 of the vending machine 1201, the menu data receiving control program 6a stores each piece of information in the RAM 5.

Then, the menu display control program 6c generates display data based on the information, and displays menu buttons on the liquid crystal touch panel 32.

Next, when the operator (owner) selects [apple juice] displayed on the liquid crystal touch panel 32 and presses a [purchase button], the menu input control program 6c detects this event and transfers it as an order command to the command transmission control program 6d.

The command transmission control program 6d transmits the order command of [apple juice] to the receiving device 12 of the station 11 via the communication device 7b.

At this time, the command transmission control program 6d transmits the credit card number of the operator (owner) that is stored in the user information 5e in the RAM 5 to the receiving device 12 of the station 11.

The vending machine 11 accepting the order command ejects the commercial article (which is herein [apple juice]) responding to the order command down to a receipt port of the machine, and notifies an unillustrated settlement center of the credit card number received.

Figure 13:
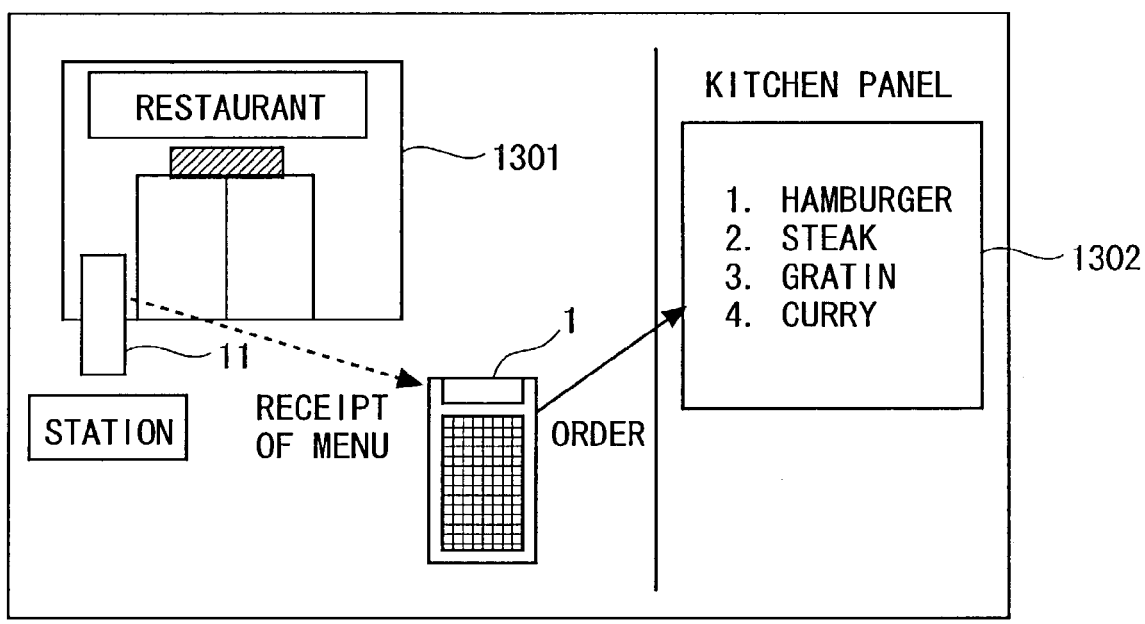
FIG. 13 is a conceptual diagram in a case of linking with an order display at the kitchen of the restaurant by use of the remote controller in the embodiment.

FIG. 13 shows an example in which the information of the reservation by the remote controller at the counter of the restaurant is reflected in display of an order receiving panel 1302 at a kitchen.

When receiving the menu data from the station 11 at the counter of the restaurant 1301, the menu display control program 6c of the remote controller body 1 generates the display data based on the information, and displays the menu buttons on the liquid crystal touch panel 32.

Next, when the operator (owner) selects the menu (e.g., [hamburger], [steak] etc) displayed on the liquid crystal touch panel 32 and presses an [order button] (unillustrated), the menu input control program 6c detects this event and transfers it as an order command to the command transmission control program 6d.

The command transmission control program 6d transmits this order command to the receiving device 12 of the station 11 via the communication device 7b.

In the restaurant 1301 accepting the order command, the order corresponding to the order command is displayed on the panel at the kitchen, and there is instruction to prepare the order article.

Note that, at this time, the credit card number registered in the user information 5e in the RAM 5 of the remote controller body 1 is, as explained in FIG. 12, transmitted together with the order command, and the settlement of payment at the restaurant 1301 may be thus simultaneously made.

FIG. 14 shows an example of use of the remote controller at a ward office or a municipal office.

At the government office, the stations are provided for every resident service. In an example shown in FIG. 14, the stations are a certificate of seal impression station 1401, a residents card station 1042 and a family register station 1403.

For example, the operator (owner) of the remote controller body 1 inserts the remote controller body 1 into a remote controller insert port 1401a of the certificate of seal impression station 1401, whereby the menu data is downloaded into the remote controller body 1 from the certificate of seal impression station 1401.

The menu data downloaded via the communication device 7a is stored as respective pieces of information in the RAM 5 by the menu data receiving control program 6a.

Next, the menu display control program 6b generates a menu screen, based on the respective pieces of information stored in the RAM 5, and displays this screen on the liquid crystal touch panel 32. A necessary menu for receiving the certificate of seal impression is thus displayed.

A pen-inputting area is set on the liquid crystal touch panel 32 of the remote controller body 1, whereby the operator (owner) can input the information as necessary items (consecutive numbers etc) by use of a stylus pen 1404.

The above-inputted information as application information together with the information such as the address, the name etc registered in the user information 5e, is transmitted to the receiving device 12 of the certificate of seal impression station 1401 from the communication device 7b by the command transmission program 6d. The certificate of seal impression station 1401 transmits a receipt number of the thus accepted application.

The remote controller body 1 receiving the receipt number displays this receipt number on the liquid crystal touch panel 32 by the menu display control program 6b. FIG. 14 shows that an applicant for this certificate of seal impression gets a number [05] as the receipt number.

It follows that the operator (owner) receives a document (the certificate of seal impression) at a front counter according to this receipt number.

INDUSTRIAL APPLICABILITY

The present invention is capable of displaying based on the individual information of the operation target device such as the TV receiver, the air-conditioner etc or on the owner, and can be utilized as the remote controller applicable at the restaurant and for the various procedures.

What is claimed is:

1. A remote control device for generating an input interface by receiving information from a station, said device comprising:
    a receiving device for receiving menu data from said station, said menu data being identified based on operation of an operation target device;
    a storage device for storing the menu data and individual information of an owner of the remote control device, the individual information representing the age information;
    a menu display module for generating a menu screen based on an age-oriented fee system and an input button which are corresponding to the individual information as display information, among the menu data received from the station by reading out the menu data from said storage device;

an input function installed display device for displaying a menu based on the display information generated by said menu display module and accepting an input;

a command transmitting module for generating a command from the input given from said input function installed display device; and a transmission device for transmitting the command generated by said command transmitting module.

2. A remote control device according to claim 1, wherein settlement information of the owner of remote controller is registered as the individual information on said storage device.

3. A remote control device according to claim 1, wherein initial setting information in addition to the individual information can be recorded on said storage device of said remote control device, said initial setting information including registration information pertaining to an operation target device.

4. A remote control device for generating an input interface by receiving information from a station, said device comprising:

a receiving device for receiving menu data from said station, said menu data being identified based on operation of an operation target device;

a storage device for storing the menu data and individual information of an owner of the remote control device, the individual information representing the distinction-of-sex information;

a menu display module for generating a food-and-drink menu suited to the distinction of sex with reference to the distinction-of-sex information in the individual information as display information, among the menu data received from the station by reading out the menu data from said storage device;

an input function installed display device for displaying the display information generated by said menu display module and accepting an input;

a command transmitting module for generating a command from the input given from said input function installed display device; and a transmission device for transmitting the command generated by said command transmitting module.

5. A remote control device according to claim 4, wherein settlement information of the owner of the remote control device is registered as the individual information on said storage device.

6. A remote control device according to claim 4, wherein initial setting information in addition to the individual information can be recorded on said storage device of said remote control device, and a communication destination device can be registered in the initial setting information.

7. A remote control system including a station and a remote controller, the station comprising:

a menu identification information storage module for storing menu identification information for identification of a menu, wherein menu data is identified based on operation of an operation target device;

display layout information storage module for storing display layout information of a display module of a remote controller;

a button layout information storage module for storing layout information of buttons on said remote controller;

a command information storage module for storing information of commands that should be transmitted to an operation target device from said remote controller;

a transmitting module for transmitting the respective pieces of information as menu data to said remote controller, the remote controller comprising;

a receiving device for receiving the menu data from said transmitting module;

a storage device for storing the menu data and individual information of an owner of the remote control device, the individual information representing the age information;

a menu display module for generating a menu screen based on an age-oriented fee system and an input button which correspond to the individual information as display information, among the menu data received from the station by reading out the menu data from said storage device;

an input module for displaying a menu based on the display information generated by said menu display module and accepting an input;

a command transmitting module for generating a command from the input on said input module; and a transmitting device for transmitting the command generated by said command transmitting module to the operation target device.

8. A remote control system according to claim 7, wherein settlement information of the owner of the remote control device is registered as the individual information on said storage device.

9. A remote control system according to claim 7, wherein initial setting information in addition to the individual information can be recorded on said storage device, and a communication destination device can be registered in the initial setting information.

* * * * *